United States Patent [19]
Obrecht et al.

[11] Patent Number: 4,826,721
[45] Date of Patent: May 2, 1989

[54] LAMINATED MATERIALS OF PRETREATED FIBRE MATERIAL AND VULCANIZATION PRODUCTS OF HYDROGENATED NITRILE RUBBER

[75] Inventors: Werner Obrecht, Moers; John Goossens, Leverkusen; Jean Mirza, Odenthal-Gloebusch; Jürgen Pabst, St. Augustin; Joachim Thörmer, Leverkusen; Zsolt Szentivanyi, Leverkusen, all of Fed. Rep. of Germany

[73] Assignee: Bayer Aktiengesellschaft, Leverkusen-Bayerwerk, Fed. Rep. of Germany

[21] Appl. No.: 53,869

[22] Filed: May 26, 1987

[30] Foreign Application Priority Data

Jun. 5, 1986 [DE] Fed. Rep. of Germany ....... 3618907

[51] Int. Cl.$^4$ ............................................. B32B 27/08
[52] U.S. Cl. .................................... 428/252; 428/520; 428/522
[58] Field of Search ......................... 428/252, 520, 522

[56] References Cited

U.S. PATENT DOCUMENTS 4,452,950  6/1984  Wideman ........................... 525/339

FOREIGN PATENT DOCUMENTS 0111412  6/1984  European Pat. Off. .
0240697  10/1987 European Pat. Off. .

*Primary Examiner*—Marion C. McCamish
*Attorney, Agent, or Firm*—Connolly and Hutz

[57] ABSTRACT

This invention relates to fabric or cord coated as an individual filament or as the finished carrier material with hydrogenated nitrile rubber and the laminated materials prepared therefrom with the vulcanized rubber. It, furthermore, relates to a latex of said hydrogenated nitrile rubber.

14 Claims, No Drawings

LAMINATED MATERIALS OF PRETREATED FIBRE MATERIAL AND VULCANIZATION PRODUCTS OF HYDROGENATED NITRILE RUBBER

The production of V-belts, toothed belts and conveyor belts is well known. These articles consist of a combination of a carrier material of fibres (such as for example, polyamide fabric, polyester fabric, glasscord, aromatic polyamide cord and the like) and several layers of rubber. There are other rubber articles which are built up in a similar way, such as, for example, membranes, hoses, containers, bulbs, tyres and the like. In all cases, it is an important object, which is not easy to achieve, to make the bonding between the surface of the carrier material and the rubber so strong that this is not the weak point in the laminated system.

The carrier materials currently used in the normal case—including those used in tyre production—are finished with the aid of latices. The finishing layers comprise several chemically different constituents. Thus, for example, in the case of glass fibres it is necessary to size the surface, and it is also advisable to use silane compounds, on which the actual transition layer is then produced. This can consist of polybutadiene homo- or copolymers (for example with acrylonitrile, styrene or 2-vinylpyridine), chloroprene homo- or copolymers or a combination thereof. It is furthermore frequently appropriate to use additional resins, such as, for example, resorcinol resins with hardeners (for example formaldehyde) and if appropriate silane compounds in this combination.

A partly or completely hydrogenated nitrile rubber (HNBR) is described in several applications (for example DE-OS No. (German Published Specification) 2,539,132; DE-OS No. (German Published Specification) 3,329,974; DE-OS No. (German Published Specification) 3,046,008 and 3,046,251; and European Patent No. A-111,412). All of these specifications describe a process for the preparation of a partly or completely hydrogenated NBR which can be vulcanized (for example with the aid of sulphur vulcanization systems or peroxide vulcanization systems). The HNBR is prepared in solution which is later converted into solid rubber. The vulcanization products are distinguished by outstanding stability to heat and oil, by excellent mechanical properties—even at higher temperatures—and by good dynamic properties. Interestingly, expansion-induced crystallization is to be observed with some of these polymers, similarly to that with natural rubber. This leads to outstanding strength and high elongations at break in the non-crosslinked and non-filled polymer.

The fabrics finished with conventional latices show distinct weaknesses in the use of peroxidically crosslinked vulcanization products and partly hydrogenated sulphur-crosslinked HNBR grades, especially after aging.

Surprisingly, it has been found that fabric or cord which have been finished with HNBR polymers or with combinations of these with vinylpyridine copolymers do not show the abovementioned weaknesses.

This patent application relates to fabric or cord coated as an individual filament or as the finished carrier material with HNBR and the laminated materials prepared therefrom with vulcanized rubber. This application furthermore relates to a HNBR latex which is suitable for coating carriers (fabric or cord) and the preparation thereof.

The HNBR grades used for coating the carrier material have a content of nitrile groups of 7 to 27% by weight, preferably 20 to 27% by weight or 7 to 18% by weight. The content of C-C double bonds is less than 40 per 1,000 C atoms, preferably less than 6 per 1,000 C atoms and particularly preferably less than 4 per 1,000 C atoms, but greater than 0.3 per 1,000 C atoms.

The HNBR polymers used to coat the carrier materials can be combined with resins and hardeners and/or vinylpyridine copolymers, the proportion of vinylpyridine copolymers in the composition being less than 50% by weight. To prepare the HNBR latex, the HNBR polymer is dissolved in a solvent. This solvent, which can also be a solvent mixture, either has a low water-solubility and forms an azeotrope with water with a solvent content of more than 50%, or the solvents/solvent have/has a boiling point below 95° C. The organic phase is emulsified by techniques which are known per se using anionic, cationic or nonionic emulsifiers or methyl cellulose.

The organic solvents or solvent mixtures used to prepare the emulsions are or consist of, for example, 3chlorotoluene, diisobutyl ketone, methylisobutyl ketone or methyl isopropyl ketone.

Mixtures of resins and hardeners, such as, for example, resorcinol and p-formaldehyde, can also be added to these latices.

The coated fabrics are embedded in a mixture of HNBR rubber and customary auxiliaries and vulcanized. Customary auxiliaries are crosslinking agents, for example peroxidically crosslinking systems or those based on sulphur and/or thiuram. The peroxidic systems preferably consist of triallylisocyanurate or triallylcyanurate (0.5 to 3 phr) and a peroxide, the 10-hour half-life of which in benzene is above 115° C. A vulcanization system consisting of 0.2 to 0.6 phr of sulphur, 1.0 to 4.0 phr of thiuram and 0.5 to 2.0 phr of sulphenamide can also be used. Thiuram here is also understood as thiuram monosulphide as well as the di- or tetrasulphide, if appropriate with any desired substituents, such as, for example, tetramethylthiuram. The sulphenamide can also be replaced by a mercapto compound, for example dibenzothiazyldisulpide.

The HNBR rubber used preferably has a) in the case of HNBR crosslinked with crosslinking agents based on sulphur, a nitrile group content of between 14 and 24% by weight, preferably 15 and 18% by weight, the content of C-C double bonds being 2 to 7 double bonds per 1,000 C atoms, preferably 3 to 5 double bonds per 1,000 C atoms, b) in the case of HNBR crosslinked with peroxidic cross-linking agents, a nitrile group content of between 14 and 24% by weight, preferably 15 and 18% by weight, the content of C-C double bonds being less than 7 double bonds per 1,000 C atoms, preferably 0.5 to 3 double bonds per 1,000 C atoms.

| Basic mixtures: | A | B | C | D | E |
|---|---|---|---|---|---|
| HNBR I* | — | 100 | — | 100 | — |
| HNBR II** | 100 | — | 100 | — | 100 |
| ZnO | 2 | 2 | 2 | 2 | 2 |
| MgO | 3 | 3 | 3 | 3 | 3 |
| Carbon black N550 | 45 | 45 | — | — | — |
| Carbon black N774 | — | — | 65 | 65 | 65 |
| Polyether-thioether | 5 | — | 5 | — | 5 |
| Phenol/formaldehyde | 5 | — | 5 | 2 | 5 |

| | | | | | |
|---|---|---|---|---|---|
| precondensate | | | | | |
| Styrenized diphenylamine | 1.5 | 1 | 1.5 | 1 | 1.5 |
| Zinc salt of mercaptoimidazole | 2.5 | 0.4 | 2.5 | 0.4 | 2.5 |
| Tirallylisocyanurate | — | 1.5 | — | 1.5 | — |
| Bis-(tert.-butylperoxy-isopropyl)-benzene | — | 7.0 | — | 7.0 | — |
| Sulphur | 0.5 | — | 0.5 | — | 1.0 |
| Tetramethylthiuramdi-sulphide (TMTD) | 2.0 | — | 2.0 | — | — |
| Benzothiazoyl-2-cyclo-hexylsulphenamide (CBS) | 0.5 | — | 0.5 | — | 1.0 |
| Tetramethylthuirammono-sulphide (TMTM) | — | — | — | — | 1.0 |

| Abbreviation | | HNBR I | HNBR II |
|---|---|---|---|
| NC | Nitrile group content (% by weight) | 17 | 17 |
| ME | Mooney viscosity (ML1-4/100° C.) ME | 74 | 70 |
| DC | Residual double bond content/1,000 carbon atoms | 2 | 6 |

EXAMPLE 1

An 8% strength 3-chlorotoluene solution of an HNBR (NC=17; 75 ME; DC=2) was prepared by dissolving at 50° C.

Polyvinyl acetate (PVA) (acetate content: 12 mol%, molecular weight ($M_w$) 80,000) was dissolved in demineralized water.

1,500 g of PVA solution (1% strength by weight) and 1,600 g of the HNBR solution were stirred together with the aid of a high-speed stirrer (10,000 rpm) (mixing time 5 minutes).

The emulsion formed was freed from the solvent in a rotary evaporator under reduced pressure (15 mm hg), and some of the water distilled off azeotropically was replaced, so that the emulsion formed had a solids content of 13% by weight.

A polyamide fabric was coated by the customary dip-coating process.

Peel test specimens (DIN 53 530) were prepared from this fabric and—for comparison—from a commercially available fabric with an NBR coating, using the basic mixtures A and E with vulcanization at 170° C./15 minutes.

| | Peel strength (N/25 mm) | |
|---|---|---|
| | HNBR coating | NBR coating |
| Mixture A | 260 | 220 |
| Mixture E | 240 | 200 |

EXAMPLE 2

A 5% strength by weight HNBR solution (NC=24; ME=85; DC=1) in methylethyl ketone was prepared. 0.6 g of resorcinol and 0.3 g of p-formaldehyde were added per 100 g of solution. A polyamide fabric was coated by a customary dip-coating process. Test specimens were prepared from the basic mixture B and the coated fabric analagously to DIN 53 530.

Vulcanization: 170° C./20 minutes.

Some of the test specimens were aged at 150° C. (hot air) for 3 days. For comparison, test specimens were produced in the same manner with commercially available polyamide fabric (SBR-Pyratex).

| | Peel strength [N/25 mm] | |
|---|---|---|
| | HNBR coating | SBR-Pyratex coating |
| without aging | 280 | 160 |
| after aging (3 days at 150° C.) | 300 | 120 |

EXAMPLE 3

An emulsion was prepared from an HNBR solution (12% by weight in methylisopropyl ketone) analogously to Example 1 (NC=17; ME=70; DC=7). PVA was used as the emulsifier (acetate content: 17 mol%; molecular weight (Mw) 82,000; PVA concentration in the water: 1.4% by weight).

The solids content of the emulsion freed from the solvent was 19%. The average particle size was 480 μm.

Glass cord was coated with the emulsion and test specimens for the T—test (cf. BAYER news for the rubber industry No. 29) were prepared with basic mixtures C and D at 170° C. over a vulcanization time of 20 minutes (embedded cord length: 20 mm). The specimens were heat-treated at 150° C. for 3 hours.

For comparison, test specimens were prepared on chloroprene-coated glass cord in the same way.

| | Tearout strength [N] | |
|---|---|---|
| | HNBR coating | Chloroprene coating |
| Mixture C | 360 | 310 |
| Mixture D | 330 | 280 |

EXAMPLE 4

An emulsion was prepared HNBR analogously to Example 1 (NC=20; ME=86; DC=7). Solvent: 3-Cl-toluene, concentration 10% by weight. Emulsifier: a mixture of abietic acid derivatives and dehydroabietic acid derivatives, ®DRESINATE 731, concentration in water: 1.6% by weight.

The solids content of the emulsion freed from the solvent was 16% by weight. Glass cord was coated. Basic muxture E was used for the preparation of the T-test specimens. Vulcanization was at 170° C./15 minutes; heat treatment at 150° C./3 hours; embedded cord length: 20mm.

Test specimens on NBR-coated glass cord were produced in the same way for comparison.

| | Coating | |
|---|---|---|
| Basic mixture E on: | HNBR | NBR |
| Tear-out strength [N] | 600 | 450 |

EXAMPLE 5

An emulsion was prepared analogously to Example 4, the solvent used and the emulsifier being varied:

| | Stability of the emulsion emulsifier: | |
|---|---|---|
| Solvent | ® DRESINATE 731 | ® AEROSOL OT-B ® NATROSOL 250HR 1:1 mixture |
| Acetone | — | — |
| 3-Chlorotoluene | ++ | ++ |

-continued

| Solvent | Stability of the emulsion emulsifier: | |
|---|---|---|
| | ® DRES-INATE 731 | ® AEROSOL OT-B ® NATROSOL 250HR 1:1 mixture |
| Diisobutyl ketone | ++ | ++ |
| Methylisobutyl ketone | ++ | ++ |
| Methylethyl ketone | − | − |
| Tetrahydrofurane | − | − |
| Dimethylformamide | − | − |
| Methylisopropyl ketone | +/− | + |

(−) no stable emulsion obtainable
(+) slight deposits; emulsion can be used to a limited degree
(++) emulsion is stable and can be used without restriction.
® DRESINATE 731, Abietu-Chemie,Gersthofen, (mixture of abietic acid derivatives and dehydroabietic acid derivatives)
® AEROSOL OT-B, American Cyanamid, (sodium salt of dioctylsulphosuccinic acid)
® NATROSOL 250HR Hercules, Lancaster (GB), (carboxylated methyl cellulose)

It can be seen from the table that 3-chlorotoluene, diisobutyl ketone and methylisobutyl ketone, and to a limited degree also methylisopropyl ketone, are suitable solvents for HNBR for the preparation of the HNBR emulsion according to the invention.

We claim:

1. Laminated material consisting of
   a) a carrier material prepared from fibres, characterized in that this is coated with hydrogenated nitrile rubber, and
   b) of one or more layers of rubber consisting of hydrogenated nitrile rubber and customary auxiliaries.

2. Laminated materials according to claim 1, characterized in that the hydrogenated nitrile rubber described under (a) has a nitrile group content of 7 to 27% by weight and the content of C-C double bonds is less than 40 double bonds per 1,000 C atoms but greater than 0.3 double bonds per 1,000 C atoms.

3. Laminated materials according to claim 1, characterized in that the hydrogenated nitrile rubber described under (a) has a nitrile group content of 20 to 27% by weight and the content of C-C double bonds is less than 6 double bonds per 1,000 C atoms but greater than 0.3 double bonds per 1,000 C atoms.

4. Laminated materials according to claim 1, characterized in that the hydrogenated nitrile rubber described under (a) has a nitrile group content of 7 to 18% by weight and the content of C-C double bonds is less than 6 double bonds per 1,000 C atoms.

5. Laminated materials according to claim 1, characterized in that the carrier material described under (a) is coated with hydrogenated nitrile rubber in combination with resins and hardeners.

6. Laminated materials according to claim 1, characterized in that the carrier material described under (a) is coated with hydrogenated nitrile rubber in combination with resins and hardeners and/or vinyl pyridine copolymers, the proportion of vinyl pyridine copolymers in the composition being less than 50% by weight.

7. Laminated materials according to claim 1, characterized in that the carrier material was coated from a latex phase, the solid of the latex consisting of a hydrogenated nitrile rubber or a combination thereof with a resin and hardener and/or vinyl pyridine copolymers.

8. Laminated materials according to claim 7, characterized in that the latex used contains an anionic emulsifier.

9. Laminated materials according to claim 7, characterized in that the latex used contains a nonionic emulsifier or methyl cellulose.

10. Laminated materials according to claim 1, characterized in that the hydrogenated nitrile rubber described under (b) has a nitrile group content of 14 to 24% by weight and a content of C-C double bonds of 2 to 7 double bonds per 1,000 C atoms.

11. Laminated material according to claim 1, characterized in that the hydrogenated nitrile rubber described under (b) is vulcanized with a vulcanization system consisting of 0.2 to 0.6 phr of sulphur, 1.0 to 4.0 phr of thiuram and 0.5 to 2.0 phr of sulphenamide.

12. Laminated material according to claim 11, characterized in that the vulcanization system contains 0.5 to 2 phr of a mercapto compound instead of 0.5 to 2.0 phr of sulphenamide.

13. Laminated materials according to claim 1, characterized in that the hydrogenated nitrile rubber described in (1b) has a nitrile group content of 14 to 24% by weight and a content of C-C double bonds of less than 7 double bonds per 1,000 C atoms, and the vulcanization is carried out with the aid of a peroxidic vulcanization system.

14. Laminated materials according to claim 13, characterized in that the peroxidic vulcanization sysem consists of 0.5 to 3.0 phr of triallylisocyanurate or triallylcyanurate and a peroxide, the 10-hour half-life of which in benzene is above 115° C.

* * * * *